United States Patent
Jeon et al.

(10) Patent No.: US 12,024,188 B2
(45) Date of Patent: Jul. 2, 2024

(54) SYSTEM AND METHOD FOR CONTROLLING VEHICLE

(71) Applicants: Hyundai Motor Company, Seoul (KR); Kia Corporation, Seoul (KR)

(72) Inventors: Seul Ki Jeon, Gyeonggi-do (KR); Eung Hwan Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 27 days.

(21) Appl. No.: 17/949,473

(22) Filed: Sep. 21, 2022

(65) Prior Publication Data
US 2023/0182760 A1 Jun. 15, 2023

(30) Foreign Application Priority Data
Dec. 14, 2021 (KR) .................. 10-2021-0178967

(51) Int. Cl.
| | |
|---|---|
| *B60W 50/14* | (2020.01) |
| *G08B 21/22* | (2006.01) |
| *G08B 21/24* | (2006.01) |
| *H04W 4/02* | (2018.01) |

(52) U.S. Cl.
CPC ............ *B60W 50/14* (2013.01); *G08B 21/22* (2013.01); *G08B 21/24* (2013.01); *H04W 4/025* (2013.01); *B60W 2050/143* (2013.01); *B60W 2050/146* (2013.01)

(58) Field of Classification Search
CPC .... G08B 21/24; G08B 21/02; G08B 21/0202; G08B 21/22; B60W 50/14; B60W 2050/143; B60W 2050/146; H04W 4/025; H04W 4/021; B60R 21/01516; B60R 21/0153; B60R 21/01542; B60R 21/01566; B60R 25/102; B60R 2025/1013; B60Q 9/00
See application file for complete search history.

(56) References Cited

U.S. PATENT DOCUMENTS

| | | | |
|---|---|---|---|
| 10,803,729 B1 * | 10/2020 | Di Mauro | G08B 21/22 |
| 2017/0106790 A1 * | 4/2017 | Huntzicker | G08B 21/24 |

* cited by examiner

*Primary Examiner* — Brian Wilson
(74) *Attorney, Agent, or Firm* — Fox Rothschild LLP (57) ABSTRACT

A vehicle control system according to an embodiment of the present disclosure includes a portable terminal that obtains a location of a driver, and a vehicle control device that determines whether to permit a delay of an occupant detection alert operation based on a location of a vehicle and the location of the driver, thereby minimizing an inconvenience of a driver due to the unnecessary occupant detection alert operation.

20 Claims, 5 Drawing Sheets

SYSTEM AND METHOD FOR CONTROLLING VEHICLE

CROSS-REFERENCE TO RELATED APPLICATION

This application claims under 35 U.S.C. § 119(a) the benefit of priority to Korean Patent Application No. 10-2021-0178967, filed in the Korean Intellectual Property Office on Dec. 14, 2021, the entire contents of which are incorporated herein by reference.

TECHNICAL FIELD

The present disclosure relates to a system and a method for controlling a vehicle.

BACKGROUND

A rear occupant alert may be referred to as a function that sends out a message along with a warning sound to confirm whether a rear occupant exists in a vehicle when a driver gets out of the vehicle. This function makes it possible to prevent in advance accidents that may occur when infants or children who may be difficult to get out on their own among rear occupants remain in the vehicle.

However, since the rear occupant alert is essentially generated when the driver gets out, the rear occupant alert frequently occurs whenever the driver gets out, thereby causing inconvenience to the driver. Accordingly, a strategy for effectively delaying the rear occupant alert may be required.

SUMMARY

The present disclosure has been made to solve the abovementioned problems occurring in the existing technologies while advantages achieved by the existing technologies may be maintained intact.

An exemplary embodiment of the present disclosure may be to provide a vehicle control system and method capable of determining whether to permit delay of an occupant detection alert operation based on a location of a vehicle and a location of a driver.

The technical problems to be solved by the present disclosure may not be limited to the aforementioned problems, and any other technical problems not mentioned herein will be clearly understood from the following description by those skilled in the art to which the present disclosure pertains.

According to an exemplary embodiment of the present disclosure, a vehicle control system may include a portable terminal that obtains a location of a driver, and a vehicle control device that is configured to determine whether to permit a delay of an occupant detection alert operation based on a location of a vehicle and the location of the driver. According to an exemplary embodiment of the present disclosure, the vehicle control device may be configured to delay an occupant detection alert operation based on the location of the vehicle and the location of the driver.

According to an exemplary embodiment, after a door of the vehicle may be opened, the vehicle control device may be configured to determine whether the location of the vehicle may be a place for automatically requesting the delay of the occupant detection alert operation.

According to an exemplary embodiment, the vehicle control device may be configured to output a guide message allowing selection of whether to delay the occupant detection alert operation or may transmit the guide message to the portable terminal, when it may be determined that the location of the vehicle may not be the place for automatically requesting the delay of the occupant detection alert operation.

According to an exemplary embodiment, the vehicle control device may be configured to receive a response corresponding to the guide message allowing the selection of the whether to delay, or may be configured to receive the response from the portable terminal.

According to an exemplary embodiment, the vehicle control device may determine whether a current state may be a state in which the delay of the occupant detection alert operation cannot be permitted, when it may be determined that the location of the vehicle may be the place automatically requesting the delay of the occupant detection alert operation, or when the delay of the occupant detection alert operation may be requested.

According to an exemplary embodiment, the vehicle control device may be configured to determine not to permit the delay of the occupant detection alert operation when it may be determined that the current state may be the state in which the delay cannot be permitted, and may immediately execute the occupant detection alert operation.

According to an embodiment, the vehicle control device may determine to permit the delay of the occupant detection alert operation, when it may be determined that the current state may be the state in which the delay may be permitted.

According to an exemplary embodiment, the vehicle control device may execute the occupant detection alert operation after a predetermined time elapses from a time when the delay of the occupant detection alert operation may be permitted, when it may be determined to permit the delay of the occupant detection alert operation.

According to an exemplary embodiment, the vehicle control device may be configured to output in advance of the occupant detection alert operation being executed a guide message for guiding that the occupant detection alert operation may be executed and a confirmation message for confirming whether there may be an additional delay, before the predetermined time elapses.

According to an exemplary embodiment, the vehicle control device may be configured to allow a guide message to be transmitted to the portable terminal informing that the occupant detection alert operation may be executed or is executed, when the predetermined time elapses.

According to an embodiment, a vehicle may comprise the vehicle control device described herein.

According to an exemplary embodiment of the present disclosure, a vehicle control method includes obtaining a location of a driver based on a location of a portable terminal, and determining, by a vehicle control device whether to permit delay of an occupant detection alert operation based on a location of a vehicle and the location of the driver.

According to an exemplary embodiment, the vehicle control method may further include determining whether the location of the vehicle may be a place for automatically requesting the delay of the occupant detection alert operation after a door of the vehicle may be opened.

According to an embodiment, the vehicle control method may further include outputting a guide message allowing selection of whether to delay the occupant detection alert operation or transmitting the guide message to the portable terminal, when it may be determined that the location of the vehicle may not be the place for automatically requesting the delay of the occupant detection alert operation.

According to an exemplary embodiment, the vehicle control method may further include receiving a response corresponding to the guide message allowing the selection of the whether to delay the occupant detection alert operation, or receiving the response from the portable terminal.

According to an exemplary embodiment, the vehicle control method may further include determining whether a current state may be a state in which the delay cannot be permitted when it may be determined that the location of the vehicle may be the place automatically requesting the delay of the occupant detection alert operation or when the delay of the occupant detection alert operation may be requested.

According to an exemplary embodiment, the vehicle control method may further include determining not to permit the delay of the occupant detection alert operation when it may be determined that the current state may be the state in which the delay cannot be permitted, and executing the occupant detection alert operation immediately.

According to an exemplary embodiment, the vehicle control method may further include determining to permit the delay of the occupant detection alert operation when it may be determined that the current state may be the state in which the delay may be permitted. According to an exemplary embodiment, the vehicle control method further includes delaying the occupant detection alert operation when the current state is the state in which the delay is permitted.

According to an exemplary embodiment, the vehicle control method may further include executing the occupant detection alert operation after a predetermined time elapses from a time when the delay may be permitted, when it may be determined to permit the delay of the occupant detection alert operation.

According to an exemplary embodiment, the vehicle control method may further include outputting in advance a guide message for guiding that the occupant detection alert operation may be executed and a confirmation message for confirming whether there may be an additional delay, before the predetermined time elapses.

According to an exemplary embodiment, the vehicle control method may further include allowing a guide message to be output informing that the occupant detection alert operation may be executed, or the guide message to be transmitted to the portable terminal, when the predetermined time elapses.

According to an exemplary embodiment, a vehicle may comprise the vehicle control system.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the drawings. In adding the reference numerals to the components of each drawing, it should be noted that the identical or equivalent component may be designated by the identical numeral even when they may be displayed on other drawings. Further, in describing the embodiment of the present disclosure, a detailed description of the related known configuration or function will be omitted when it may be determined that it interferes with the understanding of the embodiment of the present disclosure.

In describing the components of the embodiment according to the present disclosure, terms such as first, second, A, B, (a), (b), and the like may be used. These terms may be merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that may be consistent with their meaning in the context of the relevant art and will not be interpreted in an idealized or overly formal sense unless expressly so defined herein.

Figure 1:
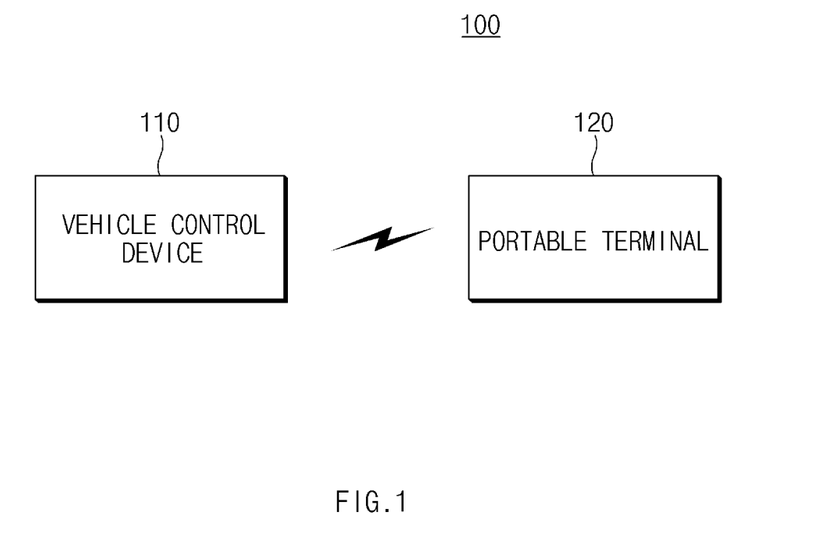
FIG. 1 is a diagram illustrating a configuration of a vehicle control system, according to an embodiment of the present disclosure.

FIG. 1 is a diagram illustrating a configuration of a vehicle control system, according to an embodiment of the present disclosure.

Referring to FIG. 1, a vehicle control system 100 according to an embodiment of the present disclosure may include a vehicle control device 110 and a portable terminal 120.

The vehicle control device 110 may be configured to determine whether to permit delay of an occupant detection alert operation based on a location of a vehicle and a location of a driver. In this case, the occupant detection alert operation may include an operation of detecting a rear occupant of the vehicle and alerting when the rear occupant is detected. The alert method may include any one or more methods of a vehicle horn sound and an emergency light blinking. A more detailed description will be described with reference to FIG. 2.

The portable terminal 120 may be configured to obtain the location of the driver and may transmit a guide message guiding that the occupant detection alert operation may be executed. A more detailed description will be described with reference to FIG. 3.

Figure 2:
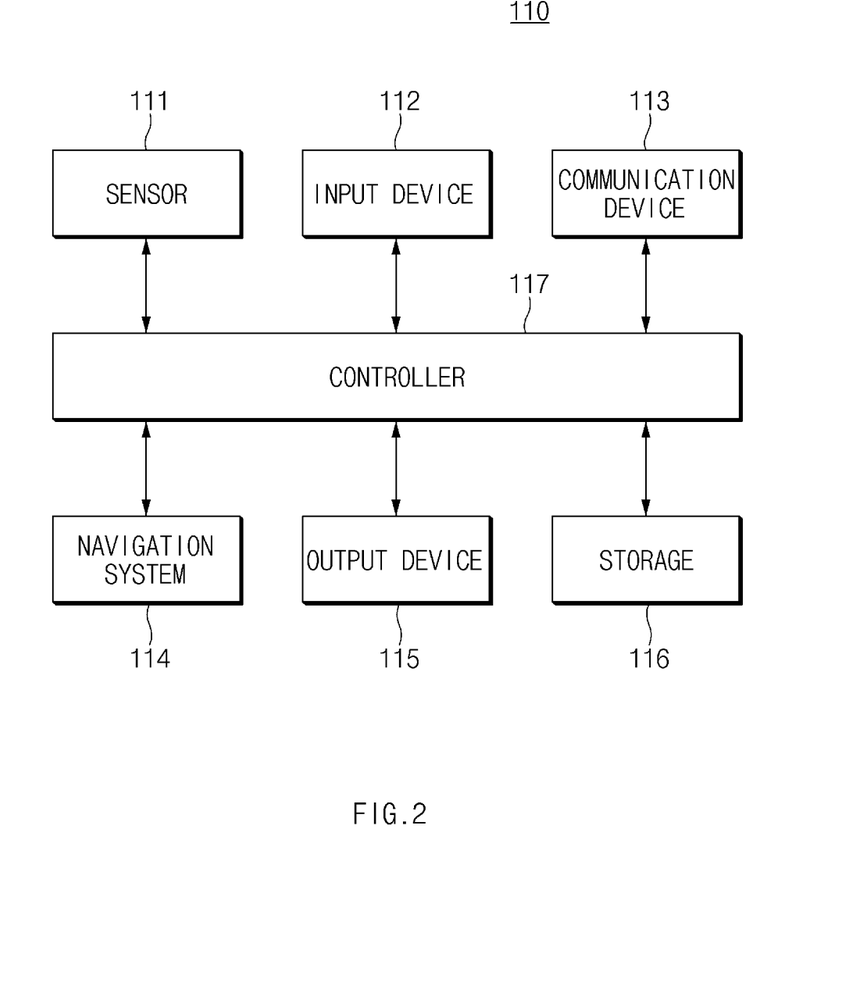
FIG. 2 is a diagram illustrating a configuration of a vehicle control device, according to an embodiment of the present disclosure.

FIG. 2 is a diagram illustrating a configuration of a vehicle control device according to an embodiment of the present disclosure.

As illustrated in FIG. 2, the vehicle control device 110 may include a sensor 111, an input device 112, a communication device 113, a navigation system 114, an output device 115, storage 116, and a controller 117.

The sensor 111 may be configured to detect whether the driver and the rear occupant get in or out and whether they may be seated. To this end, the sensor 111 may include door sensors that may be configured to detect whether a driver's seat door and rear seat door(s) may be opened, and seat sensors configured to detect a seated passenger. In addition, the sensor 111 may include a microphone that detects noise generated inside the vehicle and may include a temperature sensor that detects the outside temperature of the vehicle.

The input device 112 may be configured to receive input information for delaying the occupant detection alert operation from the driver. According to an exemplary embodiment, the input information may include information on a place requesting a delay of the occupant detection alert operation and information on the driver's request for delay of the occupant detection alert operation.

According to an exemplary embodiment, the input device 112 may be configured to receive input information corresponding thereto according to a manipulation, a motion, or a voice of the driver. According to the embodiment, the input device 112 may be implemented as a switch, a scroll wheel, a button, a knob, a touch screen, a touch pad, a lever, a track ball, etc. that may be manipulated by a driver, or may be implemented as at least one of a motion sensor that detects a motion of an occupant and a voice recognition sensor that detects a voice of the occupant, or a combination thereof.

The communication device 113 may be configured to wirelessly communicate with the portable terminal 120. According to an embodiment, the communication device 113 may perform a Wi-Fi communication or a Bluetooth communication with the portable terminal 120.

The navigation system 114 may include a GPS receiver to receive the current location of the vehicle, and may provide map image information and map audio information of a predetermined area based on the current location of the vehicle.

When the occupant detection alert operation may be delayed, the output device 115 may be configured to output a guide message informing that the occupant detection alert operation is or may be delayed for a predetermined time. In addition, the output device 115 may be configured to output in advance of the occupant detection alert operation execution a guide message guiding that the occupant detection alert operation will be executed soon before a predetermined time elapses, and may be configured to output in advance of the occupant detection alert operation execution a confirmation message to the driver to confirm whether there may be an additional delay before the predetermined time elapses. Also, when the predetermined time elapses, the output device 115 may be configured to output a guide message guiding that the occupant detection alert operation is or may be executed again, and when an occupant may be detected, may be configured to output an alert guiding that an occupant is or may be detected. According to an embodiment, the output device 115 may include a display on which a guide message and/or a confirmation message may be output, and may include a horn device and a lighting device for guiding that an occupant may be detected.

The storage 116 may be configured to store at least one algorithm for performing calculation or execution of various commands for the operation of the vehicle control device according to an embodiment of the present disclosure. The storage 116 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The controller 117 may be implemented by various processing devices such as a microprocessor in which a semiconductor chip capable of calculating or executing various commands may be embedded, and the controller 117 may control the operation of the vehicle control device according to an embodiment of the present disclosure.

The controller 117 may be configured to identify an opening history of the rear seat door. This may be to determine whether there may be an occupant in the rear seat. The controller 117 may be configured to determine whether the vehicle may be in a stopped state and the door of the driver's seat may be opened. When the vehicle may be in a stopped state and the driver's seat door may be opened, the controller 117 may be configured to determine whether the vehicle may be located in a designated place. In this case, the designated place may include a place to automatically delay the occupant detection alert operation. According to an embodiment, the designated place may include a place where the driver may return to the vehicle again within a threshold time, and may be set by the driver. For example, the designated place may include a gas station, a rest stop, and the like.

When it may be determined that the location of the vehicle may be a designated place, the controller 117 may be configured to determine that the driver may return to the vehicle within the threshold time, and thus determine that the driver automatically requests the delay of the occupant detection alert operation even when the driver does not request delay of the occupant detection alert operation through a separate input.

On the other hand, when it may be determined that the location of the vehicle may not be the designated place, since the controller 117 cannot determine whether the driver may return to the vehicle again within the threshold time, the controller 117 may be configured to output a guide message regarding whether the occupant detection alert operation may be delayed, and may allow the driver to select whether to request the delay. According to an embodiment, the controller 117 may be configured to output the guide message as 'Do you want to delay the occupant detection alert operation?' The controller 117 may be configured to transmit the guide message allowing selection of whether to request the delay to the portable terminal 120.

The controller 117 may be configured to receive a response corresponding to the guide message through the input device 112 or from the portable terminal 120, and may be configured to determine whether the driver selects to delay the occupant detection alert operation.

When it may be determined that the driver does not select the delay of the occupant detection alert operation, the controller 117 may be configured to output a guide message as 'The occupant detection alert operation is executed. When an occupant is detected, an alert will sound.'

According to an embodiment of the present disclosure, when an occupant detection alert operation may be executed and an occupant may be detected, the controller 117 may be configured to output an initial alarm guiding that an occupant may be detected after a first time period (e.g., 10 seconds) from the time when the occupant detection alert operation may be executed. According to an embodiment, the initial alarm may be output through a method such as a horn sound and/or blinking of an emergency light for about 10 seconds. The controller 117 may output a continuous alarm indicating that an occupant may be detected, after a second time (e.g., 90 seconds) when the occupant does not get off the seat or the rear seat door does not open even though the initial alarm may be output. The continuous alarm may be output through a method such as a horn sound and blinking of an emergency light for about 20 minutes, and the unlocking of the rear seat door may be controlled to be released and the rear seat door may be controlled to be forcibly opened.

When the driver selects to delay the occupant detection alert operation, the controller 117 may be configured to determine whether the current state may be a state in which the delay cannot be permitted. According to the embodiment, when the outside temperature of the vehicle may be equal to or higher than a preset temperature (e.g., 30 degrees Celsius), or when the inside noise of the vehicle may be equal to or higher than a preset noise value, the controller 117 may be configured to determine that the delay of the occupant detection alert operation may be in an unacceptable state.

When the driver selects the delay of the occupant detection alert operation but the current state may be a state in which the delay cannot be permitted, the controller 117 may be configured to allow the occupant detection alert operation to be immediately executed without permitting the delay of the occupant detection alert operation.

On the other hand, when the driver selects the delay of the occupant detection alert operation, and when it may be determined that the current state may be a state in which the delay may be permitted, the controller 117 may be configured to determine whether the driver's location may be a location where the delay may be permitted. According to the embodiment, the controller 117 may be configured to determine whether the driver may be in a location where the driver may return to the vehicle again within a threshold time. The controller 117 may be configured to determine the current location of the driver, based on the location of the portable terminal 120.

When it may be determined that the current location of the driver may be in a location where the driver may return to the vehicle again within the threshold time, the controller 117 may be configured to determine that the driver's location may be a location that permits the delay, and may be configured to permit the delay of the occupant detection alert operation.

When the delay of the occupant detection alert operation may be permitted, the controller 117 may be configured to output a guide message as 'The occupant detection alert operation is not executed for a predetermined time.'

Meanwhile, when it may be determined that the driver's location may not be a location that may permit the delay, the controller 117 may be configured to allow the occupant detection alert operation to be immediately executed.

Even though the delay of the occupant detection alert operation may be permitted, the controller 117 may be configured to continuously check a starting state of the vehicle, and when the vehicle ignition may be switched to the off state, the controller 117 may be configured to allow the occupant detection alert operation to be immediately executed.

When there may be no change in the starting state of the vehicle for a predetermined time, the controller 117 may be configured to delay the occupant detection alert operation for a predetermined time, and may be configured to output in advance a guide message guiding that the occupant detection alert operation will be executed soon before the predetermined time elapses. In addition, the controller 117 may be configured to output in advance a confirmation message for confirming whether there may be an additional delay to the driver before a predetermined time elapses. According to the embodiment, the controller 117 may be configured to output a guide message as 'The occupant detection alert operation may be executed after 1 minute. If you want an additional delay, please click the OK button.' In addition, when the predetermined time elapses, the controller 117 may be configured to output the guide message guiding that the occupant detection alert operation may be executed again, and when an occupant may be detected, the controller 117 may be configured to output an alert guiding that the occupant may be detected. According to the embodiment, the controller 117 may output the guide message as 'The occupant detection alert action will be executed. When an occupant may be detected, an alert will sound.'

According to an embodiment of the present disclosure, when outputting the guide message and the confirmation message, the controller 117 may be configured to allow the output device 115 inside the vehicle to output them, and may transmit the guide message and the confirmation message to the portable terminal 120.

The controller 117 may be configured to stop the occupant detection alert operation when the driver gets into the vehicle or the vehicle's starting state is switched to the on state while the occupant detection alert operation may be being executed.

Figure 3:
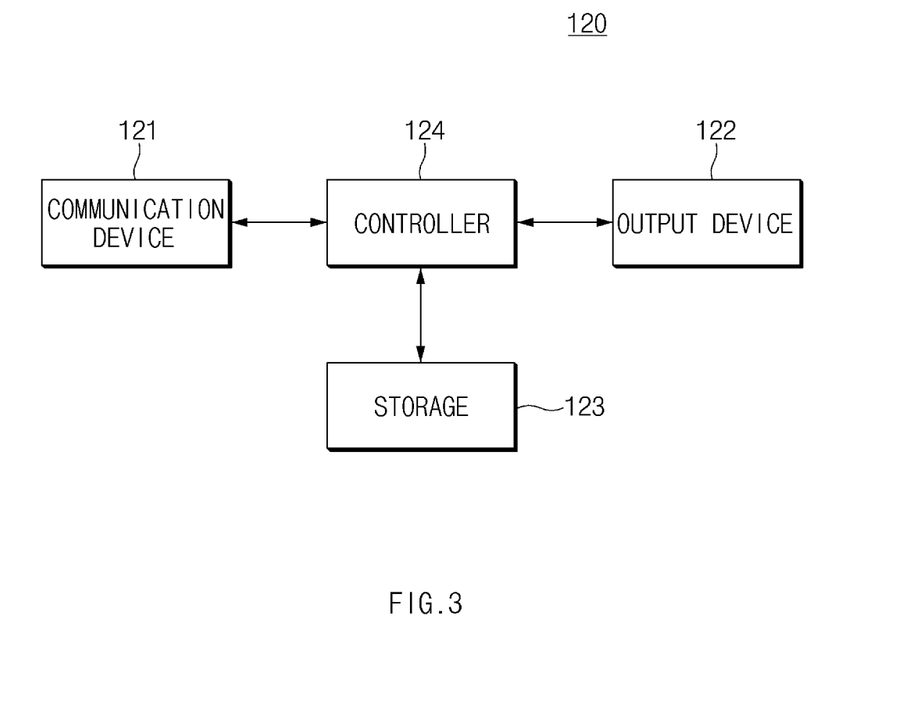
FIG. 3 is a diagram illustrating a configuration of a potable terminal, according to an embodiment of the present disclosure.

FIG. 3 is a diagram illustrating a configuration of a potable terminal, according to an embodiment of the present disclosure.

As illustrated in FIG. 3, the portable terminal 120 may include a communication device 121, an output device 122, storage 123, and a controller 124.

The communication device 121 may wirelessly communicate with the vehicle control device 110. According to an embodiment, the communication device 121 may perform a Wi-Fi communication or a Bluetooth communication with the vehicle control device 110.

The output device 122 may be configured to output a message received from the vehicle control device 110. The output device 122 may include a touch-type display, and may be implemented integrally with an input device that receives user input information.

The storage 123 may store at least one algorithm for performing calculation or execution of various commands for the operation of the portable terminal 120, according to an embodiment of the present disclosure. The storage 123 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The controller 124 may be implemented by various processing devices such as a microprocessor in which a semiconductor chip capable of calculating or executing various commands may be embedded, and the controller 124 may control the operation of the portable terminal 120 according to an embodiment of the present disclosure.

The controller 124 may determine the current location of the portable terminal 120 by receiving a navigation message transmitted by a GPS satellite. When the current location of the portable terminal 120 may be determined, the controller 124 may transmit location information of the portable terminal 120 to the vehicle control device 110.

When the guide message as to whether the occupant detection alert operation may be delayed may be received from the vehicle control device 110, the controller 124 may allow the received guide message to be output.

After the guide message as to whether to delay the occupant detection alert operation may be output, when a driver selects whether to request the delay and the selection may be inputted, the controller 124 may transmit the information input by the driver to the vehicle control device 110.

When the guide message informing that the occupant detection alert operation may be delayed may be received, the controller 124 may allow the received guide message to be output. In addition, when the confirmation message for confirming whether there may be an additional delay may be received, the controller 124 may allow the received confirmation message to be output.

After the confirmation message may be output, when the driver selects whether to request the additional delay and the selection may be inputted, the controller 124 may transmit the information input by the driver to the vehicle control device 110.

Figure 4:
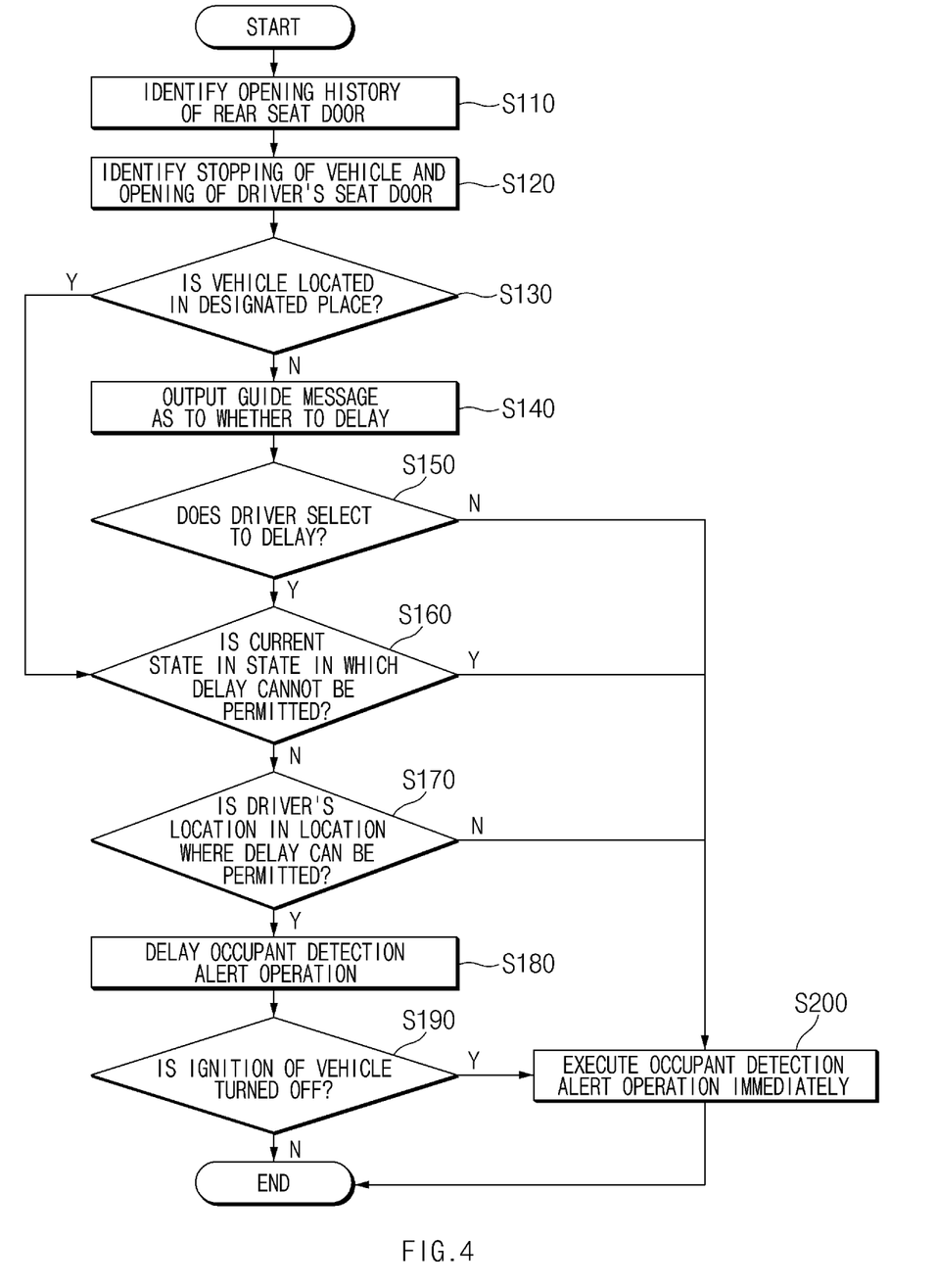
FIG. 4 is a flowchart illustrating a vehicle control method, according to an embodiment of the present disclosure.

FIG. 4 is a flowchart illustrating a vehicle control method, according to an embodiment of the present disclosure.

As illustrated in FIG. 4, the vehicle control device 110 may identify the opening history of the rear seat door (S110). This is to determine whether there is an occupant in the rear seat. When the vehicle is in a stopped state and the driver's seat door is opened (S120), the vehicle control device 110 may determine whether the vehicle is located in a designated place (S130). In this case, the designated place may include a place to automatically delay the occupant detection alert operation. According to an embodiment, the designated place may include a place where the driver may return to the vehicle again within a threshold time, and may be set by the driver. For example, the designated place may include a gas station, a rest stop, and the like.

When it is determined that the location of the vehicle is a designated place (Y) in S130, the vehicle control device 110 may perform the operation of S160 by determining that the driver may return to the vehicle within the threshold time, and by determining that the delay of the occupant detection alert operation is automatically requested even if the driver does not request the delay of the occupant detection alert operation through a separate input.

On the other hand, when the vehicle control device 110 determines that the location of the vehicle is not a designated place (N) in S130, it cannot determine whether the driver can return to the vehicle again within the threshold time, so that a guide message as to whether to delay the occupant detection alert operation may be output (S140). In addition, in S140, the driver may select whether to request the delay. According to an embodiment, the vehicle control device 110 may output the guide message as 'Do you want to delay the occupant detection alert operation?' In S140, the vehicle control device 110 may transmit a guide message to the portable terminal 120, and when the portable terminal 120 receives and outputs the guide message to allow the driver to easily check the guide message through the portable terminal 120 as well as the vehicle.

The vehicle control device 110 may determine whether the driver selects to delay the occupant detection alert operation (S150). In S150, the vehicle control device 110 may determine whether the delay is selected based on information input through the input device 112 or the portable terminal 120. When it is determined in S150 that the driver does not select the delay of the occupant detection alert operation (N), the vehicle control device 110 may immediately execute the occupant detection alert operation (S200). According to the embodiment, in S200, a guide message may be output as 'The occupant detection alert operation will be executed. When an occupant is detected, an alert will sound.' In S200, the vehicle control device 110 may transmit the guide message to the portable terminal 120, and the portable terminal 120 may output the received guide message to allow the driver to easily check the guide message through the portable terminal 120 as well as the vehicle.

According to an embodiment of the present disclosure, in S200, when the occupant detection alert operation is executed and an occupant is detected, the vehicle control device 110 may output an initial alarm guiding that an occupant is detected after a first time (e.g., 10 seconds) from the time when the occupant detection alert operation is executed. According to an embodiment, the initial alarm may be output through a method such as a horn sound and blinking of an emergency light for about 10 seconds. The vehicle control device 110 may output a continuous alarm indicating that an occupant is detected, after a second time (e.g., 90 seconds) when the occupant does not get off or the rear seat door does not open even though the initial alarm is output. The continuous alarm may be output through a method such as a horn sound and blinking of an emergency light for about 20 minutes, and the unlocking of the rear seat door may be controlled to be released and the rear seat door may be controlled to be forcibly opened.

Meanwhile, when the driver selects to delay the occupant detection alert operation in S150 (Y), the vehicle control device 110 may determine whether the current state is a state in which the delay cannot be permitted (S160).

According to the embodiment, in S160, when the outside temperature of the vehicle is equal to or higher than a preset temperature (e.g., 30 degrees Celsius), or when the inside noise of the vehicle is equal to or higher than a preset noise value, the vehicle control device 110 may determine that the delay of the occupant detection alert operation is in an unacceptable state.

When the driver selects the delay of the occupant detection alert operation but the current state is a state in which the delay cannot be permitted in (S160, Y), the vehicle control device 110 may allow the occupant detection alert operation to be immediately executed without permitting the delay of the occupant detection alert operation (S200).

On the other hand, when the driver selects the delay of the occupant detection alert operation, and when it is determined that the current state is a state in which the delay can be permitted (S160, N), the vehicle control device 110 may determine whether the driver's location is in a location where the delay can be permitted (S170).

According to an embodiment, in S170, the vehicle control device 110 may determine whether the driver is in a location where the driver can return to the vehicle again within a threshold time. The vehicle control device 110 may determine the current location of the driver, based on the location of the portable terminal 120.

When it is determined that the current location of the driver is in a location where the driver can return to the vehicle again within the threshold time in S170, the vehicle control device 110 may determine that the driver's location is in a location that may permit the delay, and may permit the delay of the occupant detection alert operation (S180).

When the delay of the occupant detection alert operation is permitted, the vehicle control device 110 may output a guide message as 'The occupant detection alert operation is not executed for a predetermined time.' In S180, the vehicle control device 110 may transmit a guide message to the portable terminal 120, and when the portable terminal 120 receives and outputs the guide message to allow the driver to easily check the guide message through the portable terminal 120 as well as the vehicle.

Meanwhile, when it is determined in S170 that the driver's location is not a location that can permit the delay (N), the vehicle control device 110 may allow the occupant detection alert operation to be immediately executed (S200).

The vehicle control device 110 may continuously identify the starting state of the vehicle even though the delay of the occupant detection alert operation is permitted. According to an embodiment, the vehicle control device 110 may determine whether the vehicle's ignition is switched to the off state (S190).

When it is determined that the vehicle's ignition is switched to the off state in S190, the vehicle control device 110 may allow the occupant detection alert operation to be immediately executed (S200).

When there is no change in the starting state of the vehicle for a predetermined time in S180, the vehicle control device 110 may delay the occupant detection alert operation for a predetermined time, and may output in advance of the occupant detection alert operation execution a guide message guiding that the occupant detection alert operation will be executed soon before the predetermined time elapses. In addition, the vehicle control device 110 may output in advance of the execution of the occupant detection alert operation a confirmation message for confirming whether there is an additional delay to the driver before the predetermined time elapses.

According to the embodiment, the vehicle control device 110 may output a guide message as 'The occupant detection alert operation is executed after 1 minute. If you want an additional delay, please click the OK button.' In addition, when the predetermined time elapses, the vehicle control device 110 may output the guide message guiding that the occupant detection alert operation is executed again, and when an occupant is detected, the vehicle control device 110 may output an alert guiding that the occupant is detected. According to the embodiment, the vehicle control device 110 may output the guide message as 'The occupant detection alert action will be executed. When an occupant is detected, an alert will sound.' The vehicle control device 110 may transmit a guide message to the portable terminal 120, and when the portable terminal 120 receives and outputs the guide message, such that the driver may easily check the guide message through the portable terminal 120 as well as the vehicle.

The vehicle control device 110 may stop the occupant detection alert operation when the driver gets into the vehicle or when the vehicle's starting state is switched to the on state while the occupant detection alert operation is being executed in S200.

Figure 5:
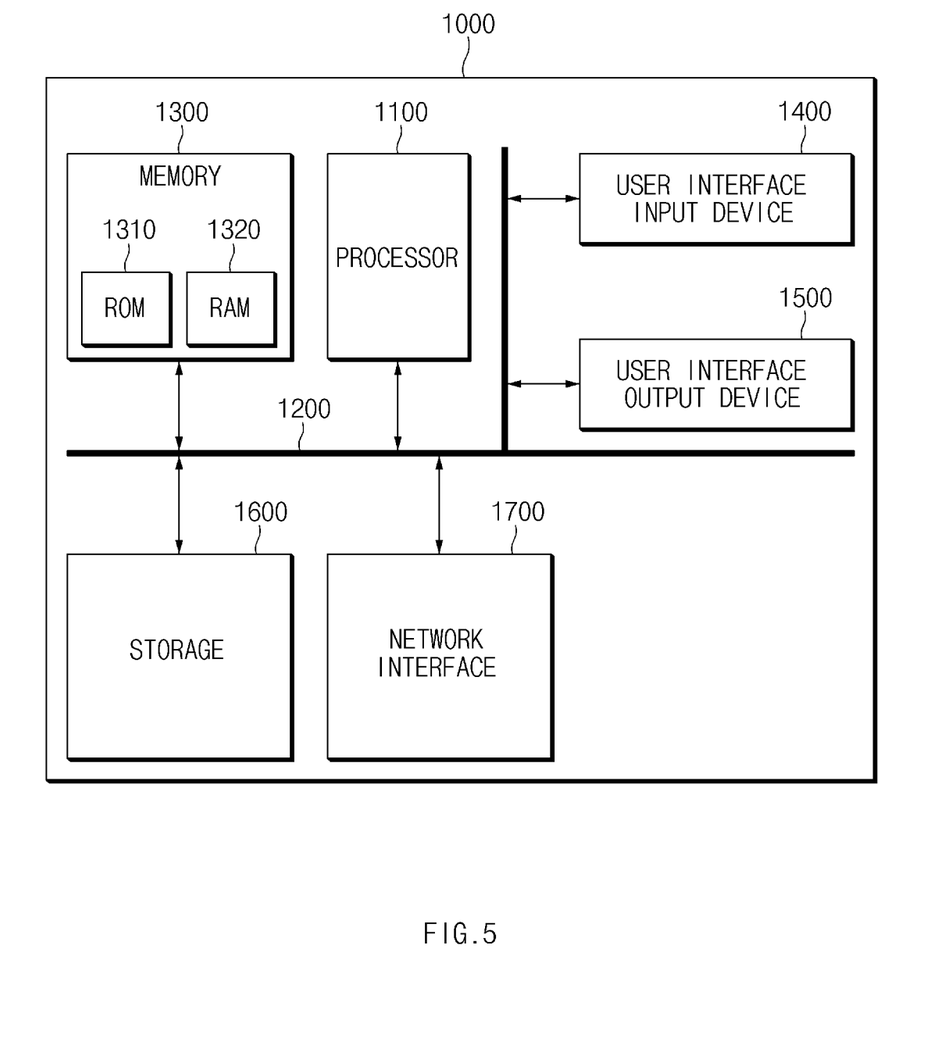
FIG. 5 is a diagram illustrating a configuration of a computing system for executing a method according to an embodiment of the present disclosure.

FIG. 5 is a diagram illustrating a configuration of a computing system according to an embodiment of the present disclosure.

Referring to FIG. 5, a computing system 1000 may include at least one processor 1100, a memory 1300, a user interface input device 1400, a user interface output device 1500, storage 1600, and a network interface 1700, which may be connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which may be executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The storage medium as an example may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

According to an embodiment of the present disclosure, a vehicle control system and a vehicle control method determine whether to permit delay of an occupant detection alert operation based on a location of a vehicle and a location of a driver, thereby minimizing an inconvenience of a driver due to the unnecessary occupant detection alert operation.

The above description may be merely illustrative of the technical idea of the present disclosure, and those of ordinary skill in the art to which the present disclosure pertains will be able to make various modifications and variations without departing from the essential characteristics of the present disclosure.

Therefore, embodiments of the present disclosure may not be intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. A vehicle control system comprising:
    a portable terminal configured to obtain a driver location of a driver; and
    a vehicle control device configured to:
        determine whether to permit a delay of an occupant detection alert operation based on a vehicle location of a vehicle and the driver location; and
        output in advance of the occupant detection alert operation execution a guide message for guiding that the occupant detection alert operation is executed, before a predetermined time elapses from a time when the delay permitted, when it is determined to permit the delay of the occupant detection alert operation.

2. The vehicle control system of claim 1, wherein the vehicle control device is configured to determine whether the vehicle location of the vehicle is a place for automatically requesting a delay of the occupant detection alert operation after a door of the vehicle is opened.

3. The vehicle control system of claim 2, wherein the vehicle control device is configured to output the guide message allowing a selection of whether to delay the occupant detection alert operation or transmit the guide message to the portable terminal when the vehicle location of the vehicle is not the place for automatically requesting the delay of the occupant detection alert operation.

4. The vehicle control system of claim 3, wherein the vehicle control device is configured to receive a response corresponding to the guide message allowing the selection of the whether to delay the occupant detection alert operation, or receive the response from the portable terminal.

5. The vehicle control system of claim 2, wherein the vehicle control device is configured to determine whether a current state is a state in which the delay cannot be permitted when it is determined that the vehicle location of the vehicle is the place automatically requesting the delay of the occupant detection alert operation, or when the delay of the occupant detection alert operation is requested.

6. The vehicle control system of claim 5, wherein the vehicle control device is configured to determine not to permit the delay of the occupant detection alert operation when it is determined that the current state is the state in which the delay cannot be permitted, and to immediately execute the occupant detection alert operation.

7. The vehicle control system of claim 5, wherein the vehicle control device is configured to determine to permit the delay of the occupant detection alert operation, when it is determined that the current state is the state in which the delay can be permitted.

8. The vehicle control system of claim 1, wherein the vehicle control device is configured to execute the occupant detection alert operation after the predetermined time elapses from the time when the delay is permitted, when it is determined to permit the delay of the occupant detection alert operation.

9. The vehicle control system of claim 1, wherein the vehicle control device is configured to output a confirmation message for confirming whether there is an additional delay, before the predetermined time elapses.

10. The vehicle control system of claim 1, wherein the vehicle control device is configured to allow the guide message to be transmitted to the portable terminal informing that the occupant detection alert operation is executed, when the predetermined time elapses.

11. A vehicle control method comprising:
    obtaining a driver location of a driver based on a location of a portable terminal;
    determining, by a vehicle control device, whether to permit delay of an occupant detection alert operation based on a vehicle location of a vehicle and the driver location of the driver; and
    outputting in advance of the occupant detection alert operation execution a guide message for guiding that the occupant detection alert operation is executed, before a predetermined time elapses from a time when the delay permitted, when it is determined to permit the delay of the occupant detection alert operation.

12. The vehicle control method of claim 11, further comprising:
    determining whether the vehicle location of the vehicle is a place for automatically requesting the delay of the occupant detection alert operation, after a door of the vehicle is opened.

13. The vehicle control method of claim 12, further comprising:
    outputting the guide message allowing selection of whether to delay the occupant detection alert operation or transmitting the guide message to the portable terminal, when it is determined that the vehicle location of the vehicle is not the place for automatically requesting the delay of the occupant detection alert operation.

14. The vehicle control method of claim 13, further comprising:
    receiving a response corresponding to the guide message allowing the selection of whether to delay the occupant detection alert operation, or receiving the response from the portable terminal.

15. The vehicle control method of claim 12, further comprising:

determining whether a current state is a state in which the delay of the occupant detection alert operation cannot be permitted when it is determined that the vehicle location of the vehicle is the place automatically requesting the delay of the occupant detection alert operation, or when the delay of the occupant detection alert operation is requested.

16. The vehicle control method of claim 15, further comprising:

determining not to permit the delay of the occupant detection alert operation when it is determined that the current state is the state in which the delay cannot be permitted, and executing the occupant detection alert operation immediately.

17. The vehicle control method of claim 15, further comprising:

determining to permit the delay of the occupant detection alert operation when it is determined that the current state is the state in which the delay can be permitted.

18. The vehicle control method of claim 11, further comprising:

executing the occupant detection alert operation after the predetermined time elapses from the time when the delay is permitted when it is determined to permit the delay of the occupant detection alert operation.

19. The vehicle control method of claim 11, further comprising:

outputting a confirmation message for confirming whether there is an additional delay, before the predetermined time elapses.

20. The vehicle control method of claim 11, further comprising:

allowing the guide message to be output informing that the occupant detection alert operation is executed or allowing the guide message to be transmitted to the portable terminal when the predetermined time elapses.

* * * * *